United States Patent
DiGiorgio et al.

(10) Patent No.: US 6,286,060 B1
(45) Date of Patent: Sep. 4, 2001

(54) METHOD AND APPARATUS FOR PROVIDING MODULAR I/O EXPANSION OF COMPUTING DEVICES

(75) Inventors: Rinaldo DiGiorgio, Easton, CT (US); Michael Bender, Boulder Creek; Stephen Uhler, Los Altos, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/106,056

(22) Filed: Jun. 26, 1998

(51) Int. Cl.$^7$ .............................. G06F 3/06; G06F 13/00
(52) U.S. Cl. ................... 710/31; 710/8; 710/38; 710/51; 710/101
(58) Field of Search .................. 710/8, 9, 10, 101, 710/51, 29, 31, 38; 708/109; 713/1; 395/821, 500

(56) References Cited

U.S. PATENT DOCUMENTS

| | | | |
|---|---|---|---|
| 5,123,092 | 6/1992 | Buxton et al. | 710/107 |
| 5,187,645 | * 2/1993 | Spalding et al. | 361/686 |
| 5,265,238 | * 11/1993 | Canova, Jr. et al. | 713/1 |
| 5,457,784 | 10/1995 | Wells et al. | 710/9 |
| 5,497,339 | * 3/1996 | Bernard | 708/109 |
| 5,555,374 | 9/1996 | Armerding et al. | 710/2 |
| 5,675,524 | * 10/1997 | Bernard | 708/109 |
| 5,841,424 | * 11/1998 | Kikinis | 345/168 |
| 5,864,708 | * 1/1999 | Croft et al. | 395/821 |

FOREIGN PATENT DOCUMENTS

| | | |
|---|---|---|
| 0831390 | 3/1998 | (EP) . |
| 9114987 | 10/1991 | (WO) . |

OTHER PUBLICATIONS

Microsoft Press, Computer Dictionary, Third Edition, 1997, p. 320.*

* cited by examiner

Primary Examiner—Thomas Lee
Assistant Examiner—Tammara Peyton
(74) Attorney, Agent, or Firm—The Hecker Law Group

(57) ABSTRACT

A method and apparatus for providing modular I/O expansion. Apparatus are provided on a host computing device and an expansion unit to support multiple port types, and multiplexing apparatus are provided to support simultaneous I/O sessions between multiple applications on the host computing device and multiple I/O ports on the expansion unit over a single host I/O port. The expansion unit is equipped with one or more port interface modules that are each configured to support data transmission in accordance with one port type from a set of port types. Apparatus on the expansion unit perform multiplexing and demultiplexing of data transmitted between the host computing device and the port interface modules of the expansion unit. Port interface objects in the host computing device each support data transmission in accordance with one port type from the set of port types. A host multiplexor on the host computing device performs multiplexing and demultiplexing of data between the expansion unit and the port interface objects. A registry is maintained to map port interface objects to port interface modules.

10 Claims, 9 Drawing Sheets

METHOD AND APPARATUS FOR PROVIDING MODULAR I/O EXPANSION OF COMPUTING DEVICES

BACKGROUND OF THE INVENTION

1. Field of the Invention

This invention relates to the field of computer electronics, and more particularly to input/output (I/O) functions of computing devices.

2. Background Art

The utility of a computer or computing device is often a function of the device's expansion capability. Most computing devices are equipped with one or more input/output (I/O) ports for connecting peripheral devices, such as modems, printers, card readers, etc. Different types of I/O ports may be used by different computing devices, such as, serial ports, infrared (IR) communication ports, and wireless (e.g., RF) communication ports. A computing device interconnected with one or more peripheral devices in this manner is referred to herein as a "host" computing device.

Peripheral devices serve to expand the available resources of a host computing device by, for example, adding communications, processing or storage capabilities. However, each host computing device is limited in its ability to support peripheral devices, and hence in its expandability, by the number and types of I/O ports provided. For example, a host computing device may be equipped with a single serial port, and be incapable of supporting any peripherals that use an IR port. Also, a host computing device may be equipped with one serial port and one IR port, but be incapable of supporting two peripheral devices that each require a serial port. Further, new types of communication ports may be developed in the future that may not interface with current communication port types. Thus, the hardware I/O configuration of the host computing device (i.e., the number and types of I/O ports) imposes limitations on the expandability of the host computing device.

Though it is a concern with most computing devices, the limitations of hardware I/O configurations can be more clearly illustrated with reference to small, portable computing devices such as personal digital assistants (PDAs), where the number of I/O ports is minimized to meet size constraints. To better understand the I/O limitations of computing devices such as PDAs, one example of a personal digital assistant is described below. In this example, the PDA is limited to a single serial port. The I/O limitations similarly exist for PDAs having a single port of a port type other than serial (e.g., IR, wireless, etc.).

The Personal Digital Assistant (PDA)

Unlike laptop computers, PDAs forego the use of a keyboard and a large display screen to maintain a compact shape capable, for example, of being carried in a pocket. In many PDAs, an electronic stylus and a small touch screen are employed for receiving user input, as well as for displaying the graphical output of the given application.

PDAs, such as the PalmPilot produced by 3Com Corporation, are designed to communicate with a personal computer to synchronize with databases located on the personal computer. Communication is achieved over an asynchronous serial link, for example, either directly with the personal computer or indirectly via a modem. Due to the desired dimensional limitations of the PDA, most PDAs have only one input/output (I/O) port, such as an RS-232 serial port, an IR port, or a wireless port. Thus, only one peripheral device matching the port type may be coupled to the PDA via the single I/O port, undesirably restricting the communication and expansion capabilities of the PDA.

FIG. 1 shows a PDA device (100) and a peripheral device (103) coupled via a serial connection. PDA device 100 is equipped with touch screen display 105, mechanical buttons (106 and 107), an electronic stylus (not shown), and serial port 102. A universal asynchronous receiver transmitter (UART) 101 is used to convert information from the PDA for transmission through serial port 102, and to convert serial information received through serial port 102. Mechanical buttons 106 are provided for user input, such as for the selection of predefined applications. Mechanical buttons 107 are provided for scrolling graphics on touch screen display 105.

Touch screen display 105 is separated into application display area 108 and user input area 109. Application display area 108 displays the graphical output of the current application being executed by PDA device 100. User input area 109 contains software buttons 110, alphabet script input area 111, and numeric script input area 112. Software buttons 110 are for performing system or application-based selection operations. Alphabet script input area 111 is used to enter alphabetical characters with the electronic stylus. Similarly, numeric script input area 112 is used to enter numeric characters with the electronic stylus. Character recognition software within the PDA converts user input in areas 111 and 112 into data characters.

Peripheral device 103 is equipped with serial connector 104 for coupling with serial port 102 of PDA device 100. Peripheral device 103 may be, for example, a personal computer or modem as previously described, or another device designed to communicate through the serial port of the PDA.

FIG. 2 is a general block diagram of the data processing components within a PDA. For simplicity, all components are illustrated as being commonly joined to bus 205. Other data paths between components may also be realized in PDA implementations. The components comprise display I/O 200, processor 201, button input 202, memory 203 and I/O port 204.

Display I/O 200 comprises the touch screen of the PDA and the video memory and driver circuitry required to display graphic output and receive touch screen input. Processor 201 comprises a microprocessor for executing sequences of instructions which embody the operating system and various applications of the PDA. Button input 202 comprises circuitry for responding to depressing of, for example, buttons 106 and 107, and converting the depressing action of the buttons into input for processor 201. Memory 203 comprises random access memory (RAM) for storing data and instructions for each application. Memory 203 may also include ROM (read-only memory) circuitry containing predefined system instructions. I/O port 204 comprises the driver circuitry and connection hardware for the single PDA I/O port, such as UART 101 and serial port 102 illustrated in FIG. 1.

FIG. 3 is a general block diagram illustrating the interaction of a PDA software application with a serial I/O port. PDA device 100 comprises PDA application 300 executing on processor 201. PDA application 300 is designed to communicate with a peripheral device, such as a personal computer. To achieve this communication, PDA application 300 sends data to, and receives data from, UART driver software 301. UART driver 301 is responsible for controlling the conversion between the parallel data format of processor 201 and the serial data format of the serial port.

UART driver 301 is assisted in the conversion process by the hardware of UART 101.

UART 101 contains data buffers and timing hardware to implement data conversion, as well as to provide control over data transmission characteristics such as baud rate. Level conversion circuitry may also be present in UART 101 to provide RS-232 signaling compatibility. A serial link is formed between the PDA and a peripheral device by coupling the serial connector of the peripheral device to the serial port of the PDA, allowing UART 101 to transmit serial data to, and receive serial data from, the peripheral device.

Peripheral devices not configured to communicate through the serial port cannot interface with the PDA. For example, wireless RF devices and IR devices are not directly supported by the FDA. This is due, at least in part, to the compact design of the PDA, which has room for only one I/O port. The type of communication is therefore restricted to the port type implemented on the PDA.

Another drawback of conventional PDAs is that only one peripheral device of the given port type may be linked with the PDA. This prevents PDAs from being used in more complex communication applications, such as transaction applications involving more than one type of peripheral device. For example, one might desire to use a smart card or similar device for implementing secure transactions over a modem connection. Unfortunately, the PDA only supports communication with the modem. Another peripheral device would be required to interface with the smart card, but no other ports exist on the PDA.

Switching mechanisms have been implemented in the prior art which allow one host serial port to be coupled to one of several peripheral serial ports. However, switching is typically performed manually by a user either mechanically throwing a selector switch or selecting the currently desired peripheral port from a menu. Further, these switching mechanisms can only expand the number of ports of the type already provided. For example, an increase from one serial port to four serial ports is of no benefit when an IR port is needed.

Some prior art switching mechanisms provide software-controlled automatic switching of peripheral ports. However, in those switching mechanisms, only one application may utilize the host serial port at a time. Therefore, a first application must release control of the host I/O port (usually when the first application has completed its use of the host serial port), before the host serial port is switched for use by a second application.

For example, consider a modem coupled to a first peripheral port and a printer coupled to a second peripheral port. If a print operation is indicated while the modem is being used, such as to print a web page loaded from a network via a modem application, the print operation is spooled to memory. Once the modem application has quit, releasing the connection between the host computing device and the modem, the host serial port is switched from the modem to the printer, and the print operation is spooled from memory to the printer. Thus, an application must release control of a peripheral port before another application may seize control, resulting in interruption or delay of I/O processing operations among different applications, and non-seamless switching of serial I/O ports.

SUMMARY OF THE INVENTION

A method and apparatus for providing modular I/O expansion of computing devices is described. An embodiment of the invention provides for an expansion of one I/O port of a host computing device to one or more ports of any port type from a set of port types. Apparatus are provided on a host computing device and an expansion unit to support multiple port types, and multiplexing apparatus are provided to support simultaneous I/O sessions between multiple applications on the host computing device and multiple I/O ports on the expansion unit over a single host I/O port.

An expansion unit communicates with an I/O port of a host computing device. The expansion unit is equipped with one or more port interface modules, each port interface module configured to support data transmission in accordance with one port type from a set of port types. Apparatus on the expansion unit perform multiplexing and demultiplexing of data transmitted between the host computing device and the port interface modules of the expansion unit. Port interface objects in the host computing device support data transmission in accordance with one port type from the set of port types. A host multiplexor on the host computing device performs multiplexing and demultiplexing of data between the expansion unit and the port interface objects. A registry is maintained to map port interface objects to port interface modules.

In one embodiment, a factory object on the host computing device is configured to provide port interface objects that support data communication in accordance with a set of port types. Based on the port interface modules present in the expansion unit, port interface objects corresponding to the port types of the port interface modules can be obtained from the factory object at runtime.

Communication between the host computing device and the expansion unit is performed via a single I/O port of the host computing device. In one embodiment, data is transmitted in accordance with a signal protocol, wherein a serial interface control signal is used to indicate whether control information or data is transmitted. In another embodiment, data is transmitted between the host computing device and the expansion unit in accordance with a packet protocol, wherein control information is passed in control packets. Apparatus on the host computing device and expansion unit are configured to encode and decode packets. In one embodiment of the invention, the expansion unit is approximately "pocket" sized, providing ease of portability and use outside the desktop environment.

DETAILED DESCRIPTION OF THE INVENTION

Figure 1:
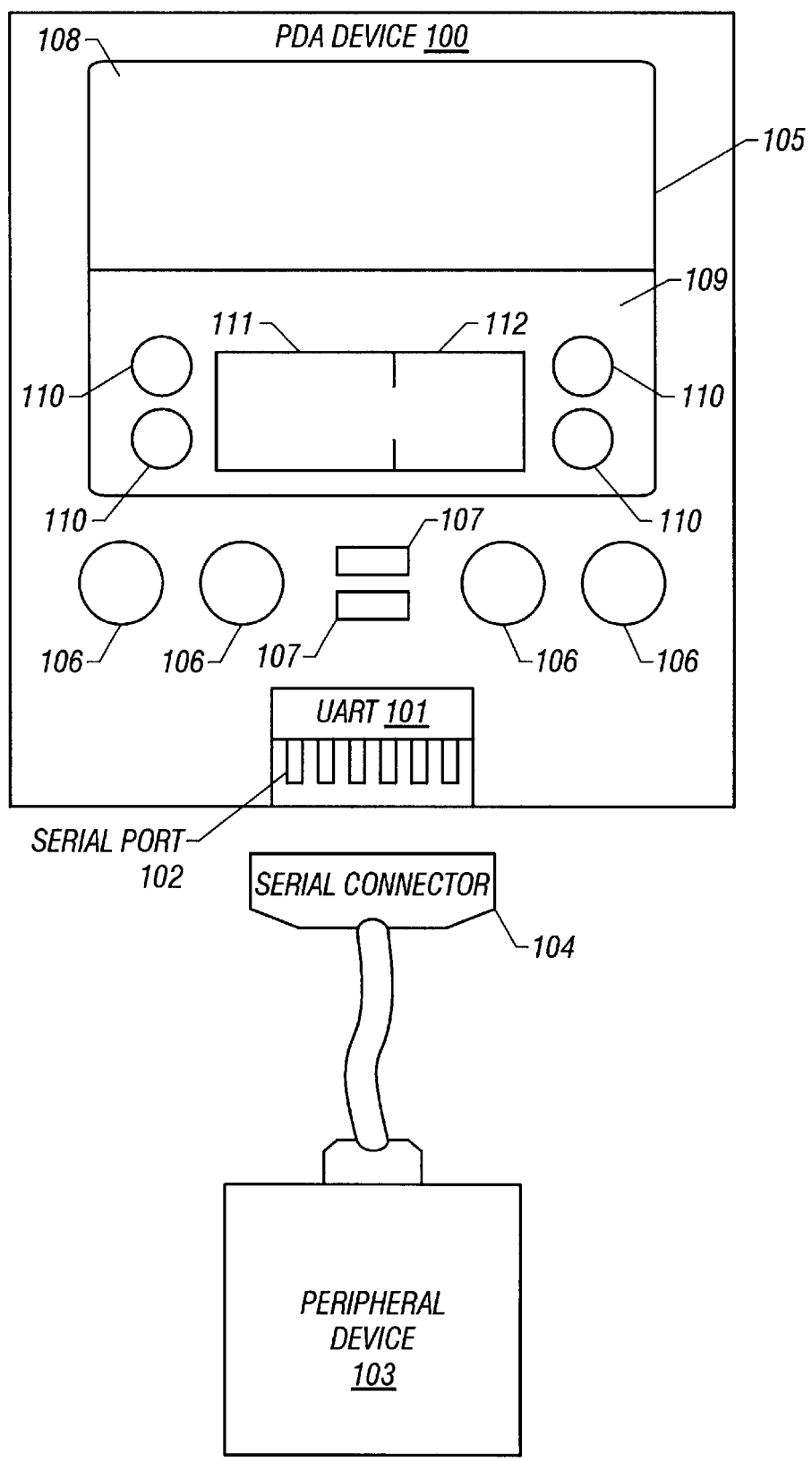
FIG. 1 is a block diagram of a personal digital assistant coupled to a peripheral device.
Figure 2:
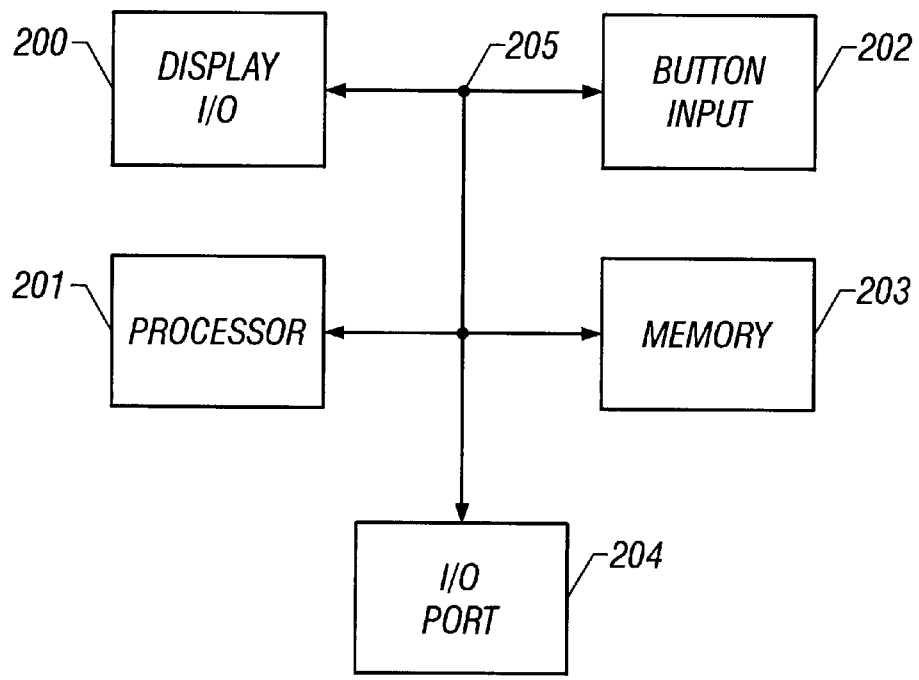
FIG. 2 is a block diagram of a sample processing architecture of a personal digital assistant or similar computing device.

The invention is a method and apparatus for providing modular I/O expansion of computing devices. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

For purposes of illustration, embodiments of the invention are described herein with reference to personal digital assistants. Embodiments of the invention can be similarly applied to any form of computing device, such as digital wallets, desktop computers, laptop computers, beepers, telephones, etc.

Embodiments of the invention overcome the I/O limitations of prior art computing devices, namely the insufficiency in the number and variety of I/O ports provided on a computing device. A single I/O port of a host computing device is used to establish a link with an expansion unit. The expansion unit is equipped with multiple port interface modules that support one or more port types or devices. Examples of port interface modules include a serial port interface, an infrared (IR) port interface, wireless modem interface, smart card reader interface, Java™ Ring interface, etc. Apparatus are provided on the expansion unit to perform device recognition on the port interface modules, and to provide multiplexing and demultiplexing of data between the host computing device and each port interface module. The host computing device is thus able to utilize, via the expansion unit, a larger number of I/O ports with a variety of possible port types.

The expansion unit also provides support for bus protocols that may not be supported by the design of a given host computing device. This reduces the need to upgrade a computing device in the face of evolving computing standards, such as bus protocol specifications. For example, a new bus protocol (e.g., USB or an IEEE standard) may be implemented within the expansion unit (e.g., as the internal bus of the expansion unit), or a port interface module can be provided to support communication using the new bus protocol. The expansion unit acts as a conversion interface to enable the host computing device to communicate with other devices that use the new bus protocol. The expansion unit therefore provides the ability to meet changing bus protocol specifications.

Software is executed within the host computing device to provide one or more virtual interfaces corresponding to one or more port interface modules on the expansion unit. In one embodiment, the virtual interfaces are provided in the form of port interface objects. Applications communicate with the port interface objects as if the port interface objects were directly driving the corresponding port interface module on the expansion unit. Multiplexing software on the host computing device provides routing of data between the port interface objects and the expansion unit in a manner that is transparent with respect to applications on the host computing device. One or more applications can thus access one or more I/O ports or devices served by the port interface modules of the expansion unit.

In one embodiment of the invention, data is transmitted using a stream model, with each port interface object and port interface module having one or more input and output streams. Polling is performed on each output stream, and a portion (e.g., one or more bytes of data) of each output stream that contains data is transmitted to the input stream of the corresponding port interface object or module. This enables each port interface object and port interface module to transmit data in turn. Multiple virtual channels can therefore be supported between the port interface objects of the host computing device and the port interface modules of the expansion unit substantially simultaneously, without significant interruption of application processes.

A single application may access multiple devices concurrently by communicating with multiple port interface objects. The ability of an application to access multiple port interface objects allows for more complicated functions to be implemented by the application. For example, a PDA may access a wireless modem interface to communicate with a business entity over a wireless network, while simultaneously accessing a smart card on another port to perform security functions, such as ID validation and encryption.

General Apparatus Of An Embodiment Of The Invention

Figure 4:
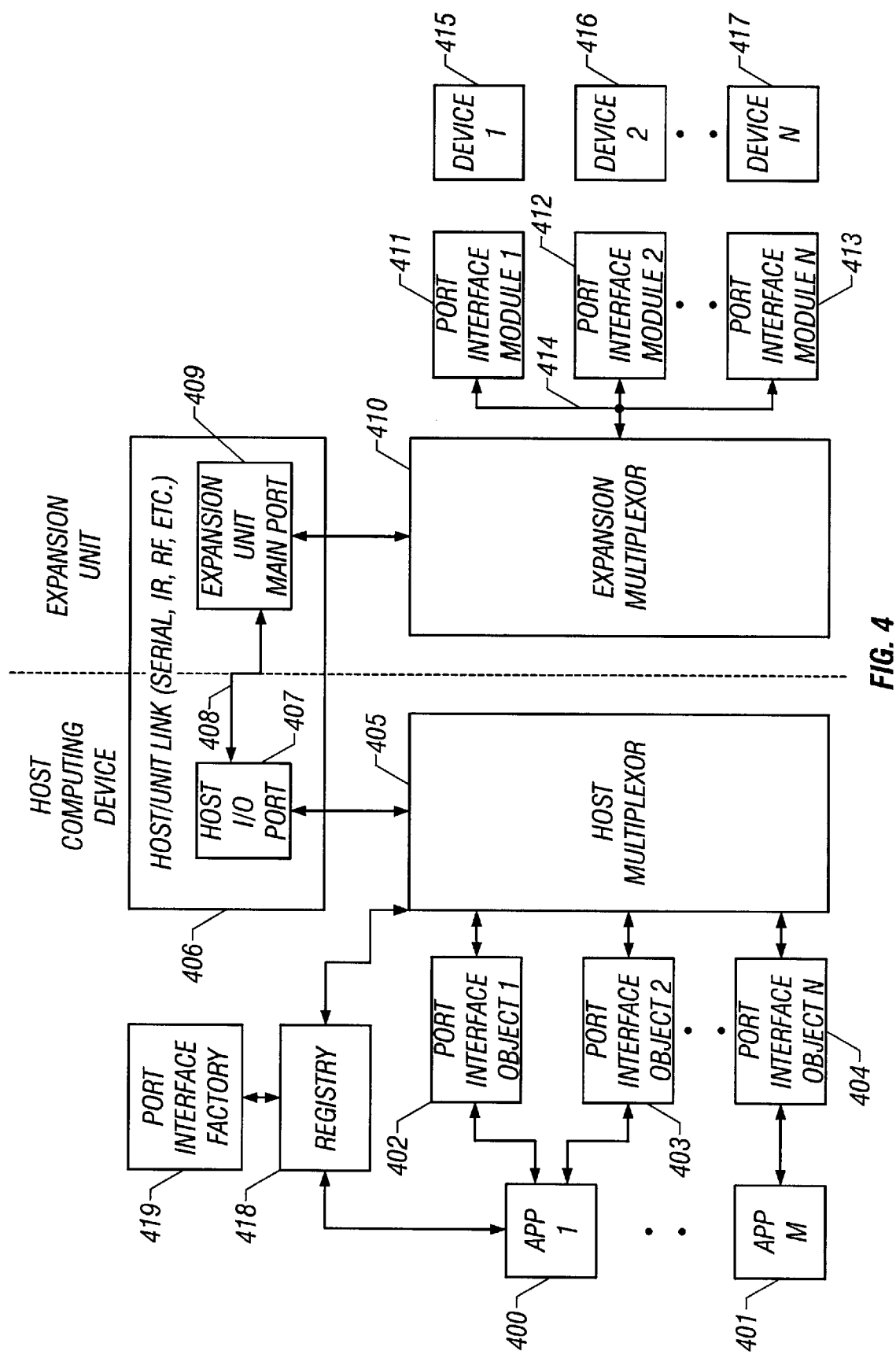
FIG. 4 is a system block diagram of a host computing device and expansion unit in accordance with an embodiment of the invention.

FIG. 4 is a block diagram illustrating the elements of a host computing device and an expansion unit in accordance with an embodiment of the invention. In FIG. 4, the host computing device comprises M applications (400–401), N interface objects (402–404), host multiplexor 405, registry 418, port interface factory 419, and host I/O port 407 (M and N are independent integers greater than zero). The expansion unit comprises expansion unit main port 409, expansion multiplexor 410, N port interface modules (411–413), and, typically, up to N devices (415–417). If one or more of devices 415–417 is itself a bus or network, multiple secondary devices may be coupled to a single port interface module via the respective bus or network.

Figure 3:
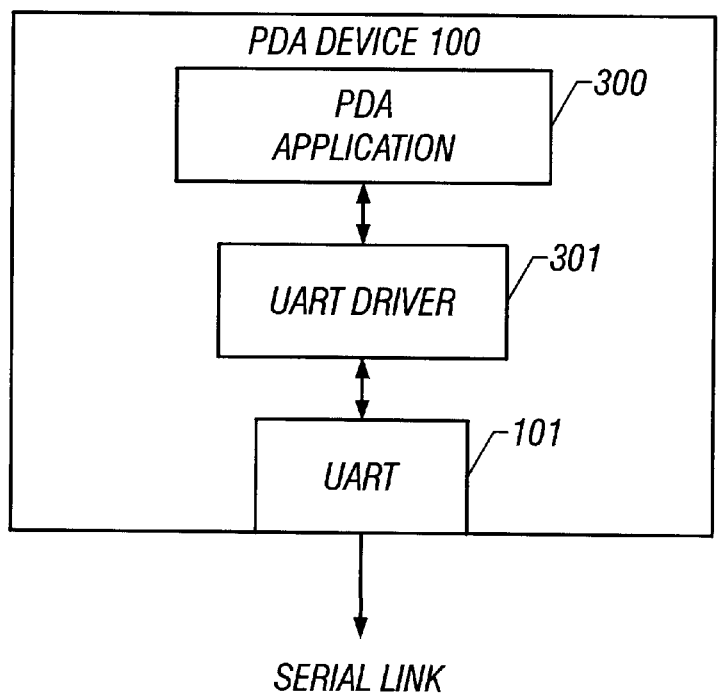
FIG. 3 is a software block diagram of a data path between an application and a serial port in a personal digital assistant or similar computing device.

In FIG. 4, applications 400–401 can include any software applications executing on the host computing device that are configured to access one or more peripheral devices through one or more I/O ports. As previously discussed with reference to FIG. 3, in the prior art, applications typically interface directly with a driver such as UART driver 301. In contrast, in the embodiment of FIG. 4, applications 400–401 interface with virtual drivers in the form of port interface objects 402–404. Each of port interface objects 402–404 presents an interface that is accessible by applications 400–401, and which emulates a driver interface of a particular port type or device. An application may access a single port interface object, as shown with the coupling of application 401 to port interface object 404. Also, an application may access multiple port interface objects, as shown by the coupling of application 400 to port interface objects 402 and 403.

Port interface objects 402–404 are coupled to host multiplexor 405 to send and receive data using a common data protocol. In one embodiment, the common data protocol comprises the use of data stream objects that may be accessed by port interface objects 402–404 and host multiplexor 405 using read( ) and write( ) method calls to read one or more bytes from, or to write one or more bytes to, respective data stream objects. Port interface objects 402–404 are configured to convert between respective emulated driver interface data protocols and the common data protocol.

Host multiplexor 405 is implemented, for example, with one or more object classes, and contains routing state information regarding the current destination interface module for data transmitted from the host computing device to the expansion unit, and the current destination interface object for data transmitted from the expansion unit to the host computing device. The routing state information regarding the destination interface object may be updated with address information transmitted from the expansion unit.

Host multiplexor 405 is configured to convert between the common data protocol used to interface with port interface objects 402–404 and the data and command protocol for driving host I/O port 407. In some embodiments, host multiplexor 405 may interact with resident driver software, such as a UART driver, for the purpose of driving host I/O port 407. In other embodiments, host multiplexor 405 may provide the driver software functionality directly. The specific command set and data format is dependent on the port type of host I/O port 407. In one embodiment, a factory object (not shown) is used at runtime to provide, from a set of driver object classes, an instance of a driver object class that implements the port specific functionality of the given type of host I/O port.

Host/unit link 406 comprises host I/O port 407, expansion unit main port 409, and the mechanism 408 by which host I/O port 407 and expansion unit main port 409 are joined. Mechanism 408 may be any form of connection that supports transmission between ports 407 and 409 of "carrier waves," where carrier waves are communication signals in which data may be embedded. For example, ports 407 and 409 may be IR ports, and mechanism 408 may comprise a line-of-sight or fiber-optic channel for infrared transmissions between ports 407 and 409. If ports 407 and 409 are standard serial ports, mechanism 408 may be a serial cable. If ports 407 and 409 comprise wireless modems, mechanism 408 may be a wireless connection. Ports 407 and 409 may also comprise parallel ports, modems, or other linking mechanisms.

Expansion multiplexor 410 is configured to drive expansion unit main port 409, or to interface with a separate driver mechanism, such as a UART, for that purpose. Similarly to host multiplexor 405 on the host computing device, expansion multiplexor 410 maintains routing state information regarding the destination port interface object for data transmitted to the host computing device, and the destination port interface module for data transmitted from the host computing device. Data received from the host computing device is routed over bus 414 to one of port interface modules 411–413 as specified in the routing state information. If a new address or device ID is transmitted from the host computing device, expansion multiplexor 410 uses the received address or device ID to update the routing state information.

Maintaining separate transmitting state and receiving state for transmitting and receiving data, respectively, allows for transmission and receiving processes to be handled independently. This means that data may be transmitted, for example, from port interface object 402 to corresponding port interface module 411, while, in the opposite direction, data may be transmitted from port interface module 413 to corresponding port interface object 404. In other embodiments, routing state for transmitting and receiving are combined. This means that, for example, if data is being transmitted from port interface object 402 to port interface module 411, then transmission in the other direction is confined to transmission from port interface module 411 to port interface object 402.

Expansion multiplexor 410 is further configured to perform device recognition on the devices coupled to the expansion unit. For example, when the expansion unit is powered on, or in response to a query request from the host computing device (e.g., from host multiplexor 405), expansion multiplexor 410 may query each of port interface modules 411–413 for identification information (ID). The returned ID typically takes the form of a device name or port type which expansion multiplexor 410 associates with an address for the respective port interface module. The device name or port type is then transmitted to the host computing device for addition to registry 418.

Port interface modules 411–413 are coupled to bus 414 send data to, and to receive data from, expansion multiplexor 410. Bus 414 may be any type of bus for connecting multiple electronic devices, such as a standard parallel bus, inter-integrated circuit ($I^2C$) bus, universal serial bus (USB), Sbus, PCI bus, etc. Port interface modules 411–413 are coupled to devices 415–417, respectively. Port interface modules 411–413 are configured to provide any conversion of data and command signals between the bus protocol of bus 414 and the respective one of devices 415–417.

Port interface modules 411–413 also provide the physical interconnection configurations necessary to support the respectively coupled devices, including, in some embodiments, both data and power signals. For example, a port interface module may provide an ethernet port for coupling to a network, a serial port for transmitting RS-232 signals to a serial device, a PCMCIA slot that accommodates a PCMCIA card, or an IR port for communicating with an IRDA device. A port interface module may also directly incorporate more complex devices, such as a wireless modem, or a reader for smart cards or smart rings (e.g., Java Rings).

In one embodiment of the invention, port interface modules 411–413 are hardwired into the expansion unit in a fixed configuration. In another embodiment supporting a variable port configuration, bus 414 is equipped with a number of plug-in interconnects for plugging in port interface modules 411–413. Any combination of port interface modules is therefore possible. Further, the expansion unit can support present and future port types. New port modules may be provided to support new port types as they are developed, allowing for the expansion unit and the host computing device to keep pace with advances in port technology. Expansion unit main port 409 may be similarly implemented, in some embodiments, as a pluggable module to support swapping of main port modules of various port types.

Interface Registry

Registry 418 of FIG. 4 maintains a mapping between port interface objects 402–404 and port interface modules 411–413 in the form of, for example, references to port interface objects 402–404 indexed by associated device names. Registry 418 supports lookup( ), add( ) and delete( ) method calls. Lookup( ) method calls are performed by applications 400–401 that desire to locate and communicate with a particular device as will be discussed below. The add( ) and delete( ) method calls are initiated by host multiplexor 405 based on information transmitted from the expansion unit.

When a port interface module or device is added to or removed from the expansion unit, expansion multiplexor 410 may send a control message to host multiplexor 405 identifying the name of the port interface module or device at issue. An add( ) or delete( ) method call is made to registry 418 as appropriate.

Figure 5A:
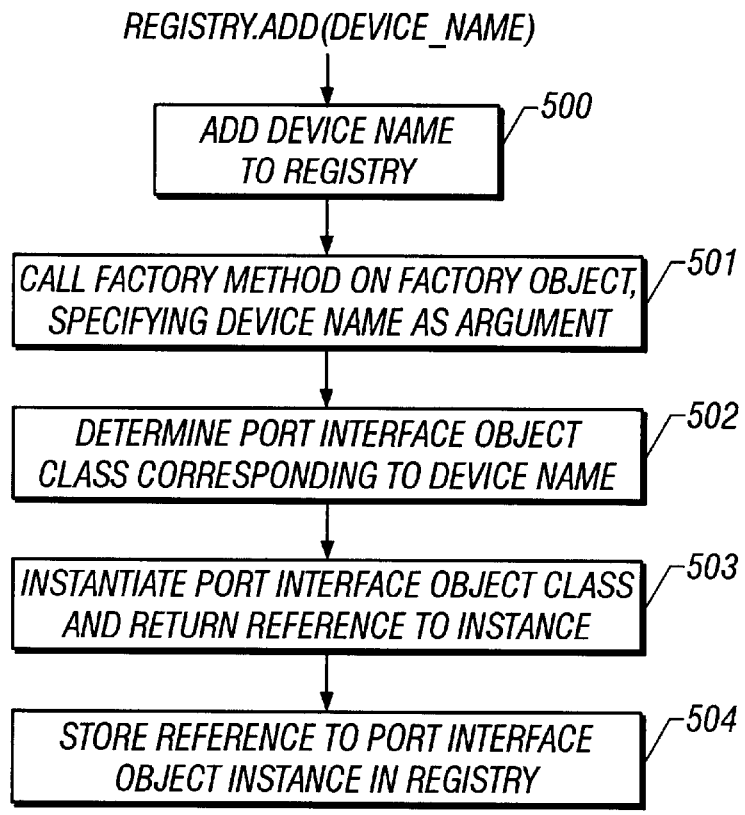
FIGS. 5A and 5B are flow diagrams of registry methods in accordance with an embodiment of the invention.

The add( ) method call is performed by the host multiplexor when it receives notification from the expansion unit, via a control message, that a device is now available for use. The device name is specified in the arguments of the add( ) method call. FIG. 5A illustrates the flow of the add( ) method in accordance with an embodiment of the invention.

In response to an add( ) method call, in step 500, registry 418 adds a table entry for the device name specified in the method call. In step 501, registry 418 invokes a factory method of port interface factory 419, specifying the device name in the arguments of the method call. In step 502, port interface factory 419 determines, from a set of supported port and device-specific port interface classes, a port interface object class that corresponds to the specified device name. Port interface factory 418 may support a variety of specific interface classes, such as, for example, a GCR400 smart card reader device interface, a generic serial port interface, an IR device interface, a cellular phone interface, and a Java Ring reader interface. In step 503, port interface factory 419 instantiates the corresponding port interface object class, and returns a reference to the port interface object instance. The returned reference is associated with the device name in registry 418 in step 504.

In an another embodiment, instances of port interface objects are pregenerated, and either fixed in the registry or obtained from a fixed pool of port interface objects at runtime. However, the factory implementation offers more efficient use of processing resources and greater flexibility in accommodating devices added during runtime.

The delete( ) method call removes the registry entry for the specified device name, and may initiate clean-up and recovery of system resources, such as memory allocated to an associated port interface object instance.

Figure 5B:
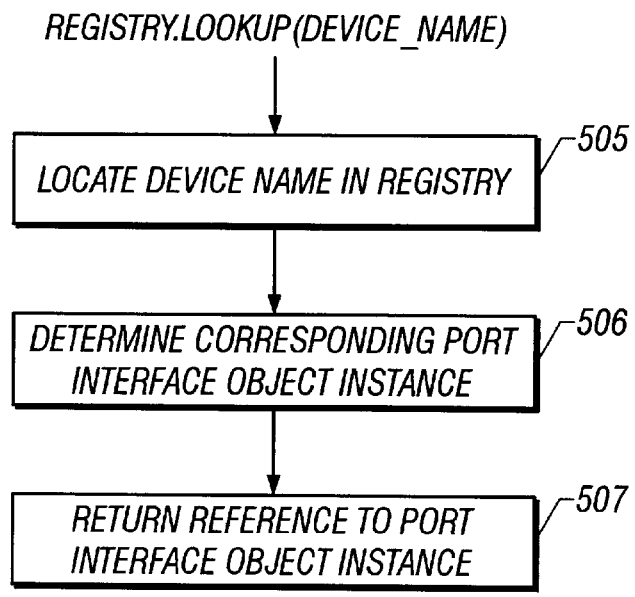

When one of applications 400–401 wishes to access a particular device, the application sends a lookup( ) method call to registry 418, specifying the name of the device, for example. FIG. 5B illustrates the flow of a lookup( ) method in accordance with an embodiment of the invention. In step 505, in response to the lookup( ) method call, registry 418 locates the specified device name in the its mapping table. In step 506, registry 418 identifies the port interface object instance that corresponds to the specified device name, and in step 507, a reference to the port interface object is returned to the calling application. The application may then use the object reference to communicate with the desired device via the given port interface object.

Multiplexing Implementation

Multiplexing of data by host multiplexor 405 and expansion multiplexor 410 may be implemented in different manners, such as a proactive process using polling procedures, or a reactive process that relies on port interface objects or devices to initiate data multiplexing and transmission. The proactive process provides greater control over transmission, whereas the reactive process allows for minimal complexity in the multiplexor implementation.

In the proactive process, host multiplexor 405 polls each port interface object (or associated stream object) on the host computing device to determine whether each respective port interface object has data for transmission to the expansion unit. If a port interface object does have data to transmit, host multiplexor 405 proceeds with data multiplexing and transmission for the given port interface object. If a port interface object does not have data to transmit, the multiplexor proceeds to the next port interface object in the polling order. Expansion multiplexor 410 performs in a similar manner with respect to the transmission of data from the port interface modules of the expansion unit.

In some embodiments, the polling order may be manipulated to accommodate the higher relative bandwidth needs of certain device types, such as by providing multiple slots in a polling list to the port interface object (or module) of a high bandwidth device. Restrictions, that may also be device-dependent, can be set on the amount of data transmitted during any polling cycle to insure desired response times. Interleaving of data provides for the servicing of multiple "virtual channels" over the single host/unit link, with each virtual channel corresponding to a port interface object/port interface module pair. Each virtual channel is granted a portion of the available bandwidth with which to communicate.

In the reactive process, host multiplexor 405 reacts to transmission requests from the port interface objects. The requests are typically queued and handled on a FIFO (first in, first out) basis by the multiplexor. However, the requests may also be treated as interrupts having device-dependent priorities. Expansion multiplexor 410 responds to data transmission requests from port interface modules in a similar manner.

Host multiplexor 405 responds to data transmissions received from the host I/O port (i.e., from the expansion unit) by transmitting the data to the specified destination port interface object. Likewise, expansion multiplexor 410 responds to data transmissions received from the expansion unit main port (i.e., from the host computing device) by transmitting the data to the specified destination port interface module.

Figure 6A:
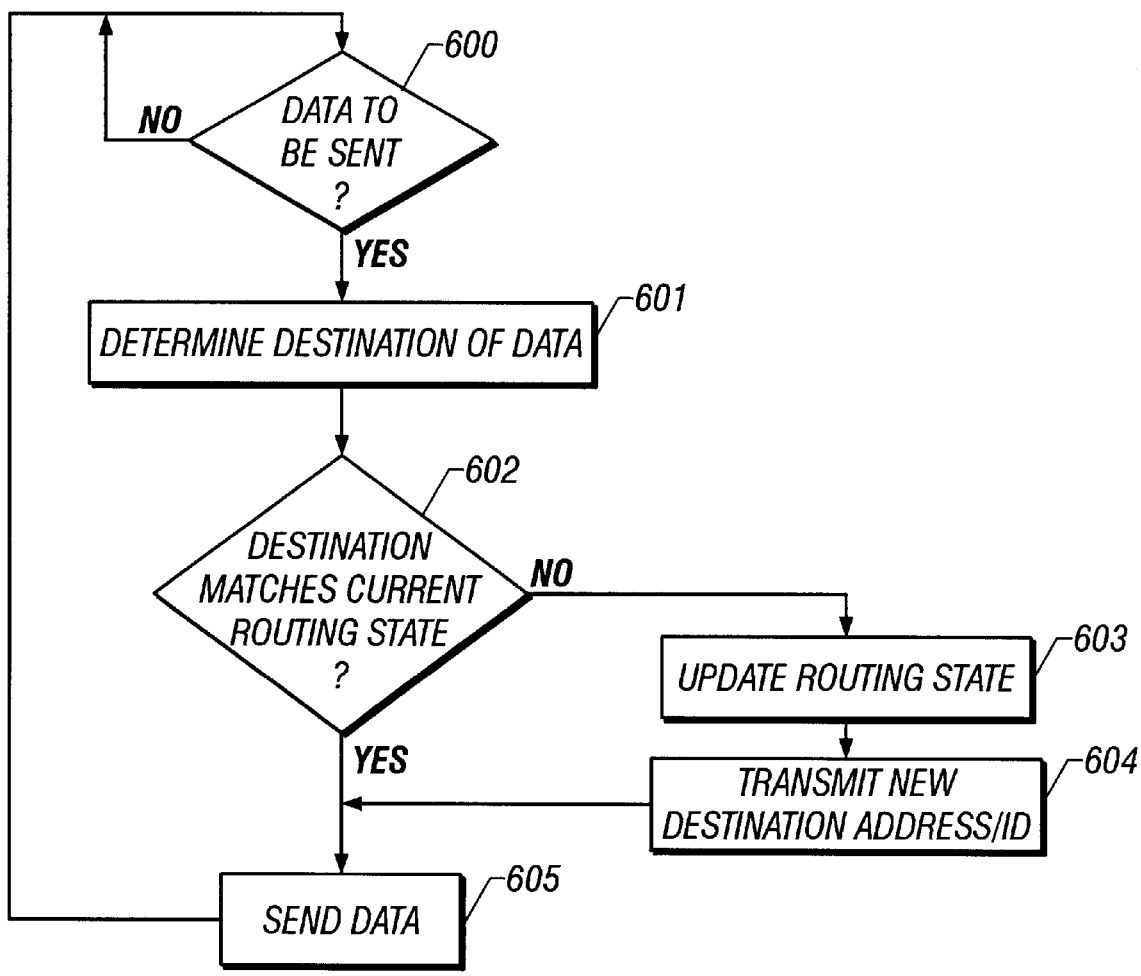
FIGS. 6A and 6B are flow diagrams of multiplexing processes in accordance with an embodiment of the invention.
Figure 6B:
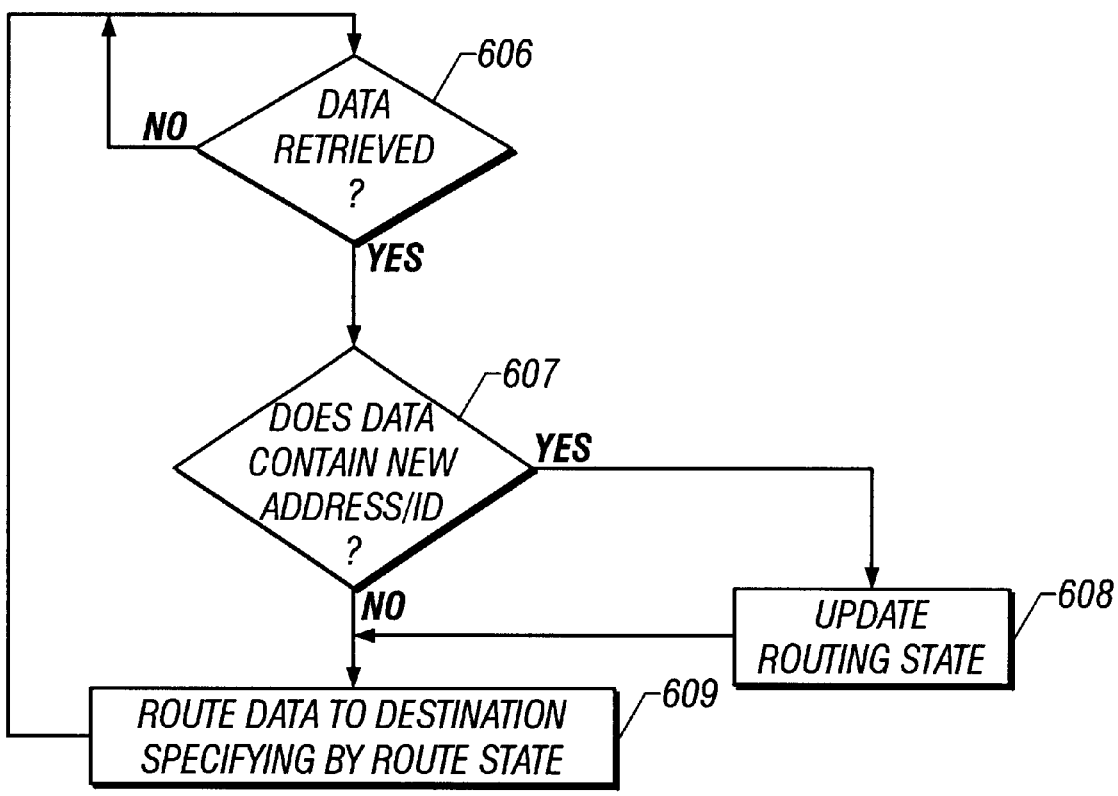

FIGS. 6A and 6B illustrate example multiplexor process flows for handling data to be transmitted from a port interface object or module, and for handling data received over the host/unit link, respectively. For a host computing device, the processes of FIGS. 6A and 6B are executed in host multiplexor 405, for example, as software routines executed by the processor of the host computing device. For an expansion unit, the processes of FIGS. 6A and 6B are executed in expansion multiplexor 410, for example, by dedicated hardware or as software or firmware routines executed by a controller. Process flow is discussed with reference to a "local" multiplexor (i.e., the multiplexor executing the process) and a "remote" multiplexor. With respect to execution within the host computing device, host multiplexor 405 is the "local" multiplexor, and expansion multiplexor 410 is the "remote" multiplexor. With respect to execution in the expansion unit, expansion multiplexor 410 is the "local" multiplexor and host multiplexor 405 is the "remote" multiplexor.

The multiplexor in the host computing device and the multiplexor in the expansion unit have matching routing state to properly route data between port interface objects and corresponding port interface modules. Determinations of current routing state are performed, in one embodiment, by a local multiplexor reading its own locally stored copy of the routing state. The process flows of FIGS. 6A and 6B include update steps for maintaining appropriately matched routing state.

In FIG. 6A, the process begins in step 600 where a determination is made of whether there is data to be sent to the host/unit link (e.g. transmitted from a port interface object in the case of host multiplexor 405, or transmitted from a port interface module in the case of expansion multiplexor 410). This determination may be made in accordance with either the proactive or reactive processes described above. When there is data to be sent, in step 601, the local multiplexor determines the destination of the data transmission. If, in step 602, the destination matches the current routing state of the local multiplexor, the destination is the same as the preceding data transmission, and no routing updates are necessary. The local multiplexor proceeds to transmit the data over the host/unit link in step 605.

If, however, in step 602, the destination does not match the current routing state of the local multiplexor, the process continues at step 603. In step 603, the local multiplexor performing the data transmission updates its own routing state directly to reflect the new destination, and, in step 604, transmits the new destination address (or device name, depending on implementation) to the remote multiplexor via the host/unit link to permit the remote multiplexor to updates its own state. The local multiplexor then proceeds to step 605 wherein the data is transmitted over the host/unit link.

In FIG. 6B, the process begins when a determination is made at step 606 that data has been received over the host/unit link. In step 607, a determination is made as to whether the data received contains a new address or ID. If the received data does contain new address or ID information, the routing state of the local multiplexor is updated, in step 608, to reflect the new address or ID, and subsequent data is directed, in step 609, to the destination specified by the updated routing state. If, in step 607, the data does not contain address or ID information, the data is transmitted, in step 609, to the destination specified by the current routing state.

Control messages sent between the host multiplexor and the expansion unit multiplexor may be implemented using a special address. The receiving multiplexor recognizes the address as a control message indicator and processes the subsequent data, if there is any, in accordance with a specified control operation. For example, in a registry update control message sent from the expansion unit to the host computing device, the data following a control address may specify that an add( ) or delete( ) operation be performed for a given device name. Thus, control messages can be implemented within the multiplexing framework.

Data Protocol Between Host and Expansion Unit

Data transmission between the host computing device and the expansion unit may use a variety of different protocols. Two specific protocols, referred to as a "signal" protocol and a "packet" protocol are discussed below. The signal protocol is suited to design embodiments wherein there is minimal intelligence on the expansion unit, and an extra control signal is available on the host/expansion unit link. The packet protocol requires no extra control signal, but necessitates the provision of apparatus for packing and unpacking data packets.

Figure 7A:
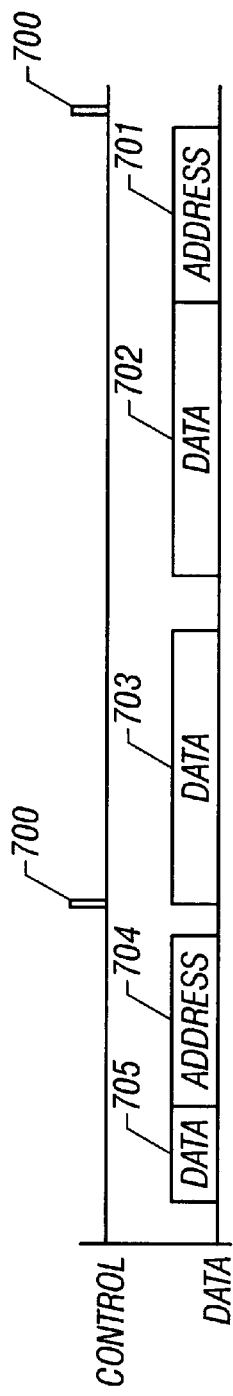
FIGS. 7A and 7B are signal diagrams illustrating a signal protocol and a packet protocol, respectively, in accordance with an embodiment of the invention.

In accordance with the signal protocol, a control signal is used to indicate when address or ID information (i.e., routing state update information) is being transmitted through the host/unit link. FIG. 7A illustrates an example of the signal protocol. The data signal shown consists of a sequence of data blocks: address block 701, data block 702, data block 703, address block 704 and data block 705. The control signal is asserted, as evidenced by control pulse 700, to indicate the transmission of address blocks 701 and 704. The receiving device interprets a fixed number of data bits received after a control pulse as address information. This address information is used to update the routing state of the resident multiplexor.

Any data following the address information is assumed to be targeted to the destination identified by the most recently sent address information as it exists in the routing state. Thus, data block 702 is associated with address block 701, and data block 705 is associated with address block 704. Though a gap exists between data block 702 and data block 703, data block 703 is assumed to be directed to the destination identified in address block 701.

In accordance with the packet protocol, an extra control signal is not required to indicate the occurrence of address information. Data transmitted over the host/unit link is first converted into a packet having a header portion and a data portion. The data portion contains the data being transmitted, whereas the header portion contains address information for updating the routing state of the destination multiplexor, and length information specifying how many data bits or bytes are in the packet. Other information, such as packet sequence numbers, may be incorporated into the packet structure as well, depending on the desired implementation.

To support the packet protocol, the host computing device and the expansion unit are equipped with software or hardware apparatus for formatting the data into the packet structure, including determining the destination and length of the data for insertion into the packet header. The software or hardware apparatus further performs unpacking functions, including extracting address information to update the routing state, and extracting the data length to further unpack the data for transmission to its destination.

Figure 7B:
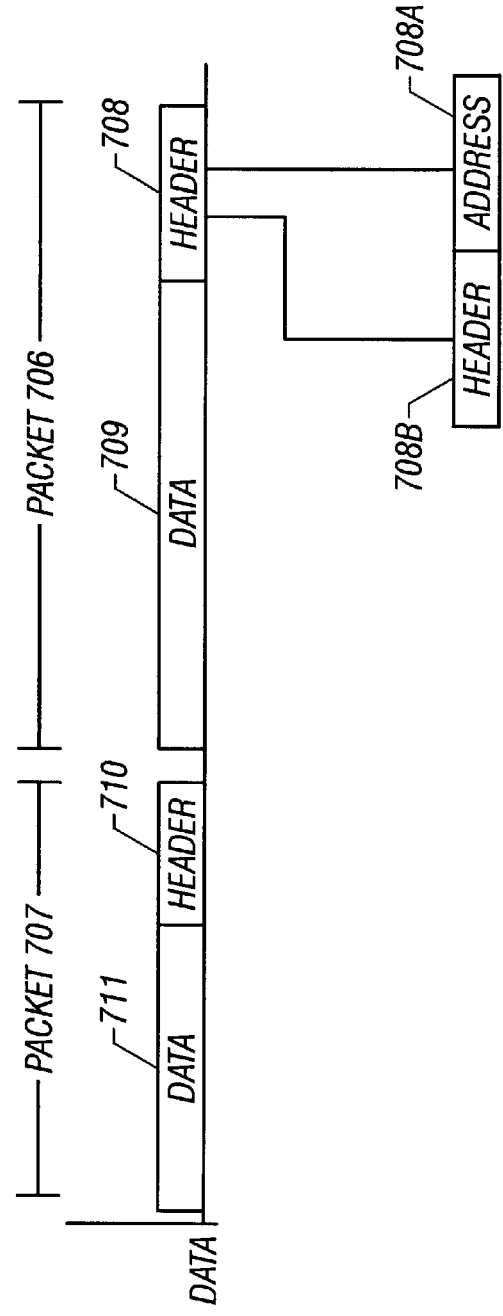

FIG. 7B illustrates an example of the packet protocol. The data signal comprises data packets 706 and 707. Packet 707 comprises header portion 710 and data portion 711. Similarly, packet 706 comprises header portion 708 and data portion 709. The header portion of the data packet further comprises an address portion 708A and length portion 708B. The packet protocol requires extra packet formatting apparatus and can result in the transmission of unnecessary redundant information, such as when two consecutive packets share the same destination address. However, for lossy connections, packet sequence numbers can assist in identifying and recovering lost packets for more reliable data transmissions.

Example Expansion Unit Implementation

Figure 8:
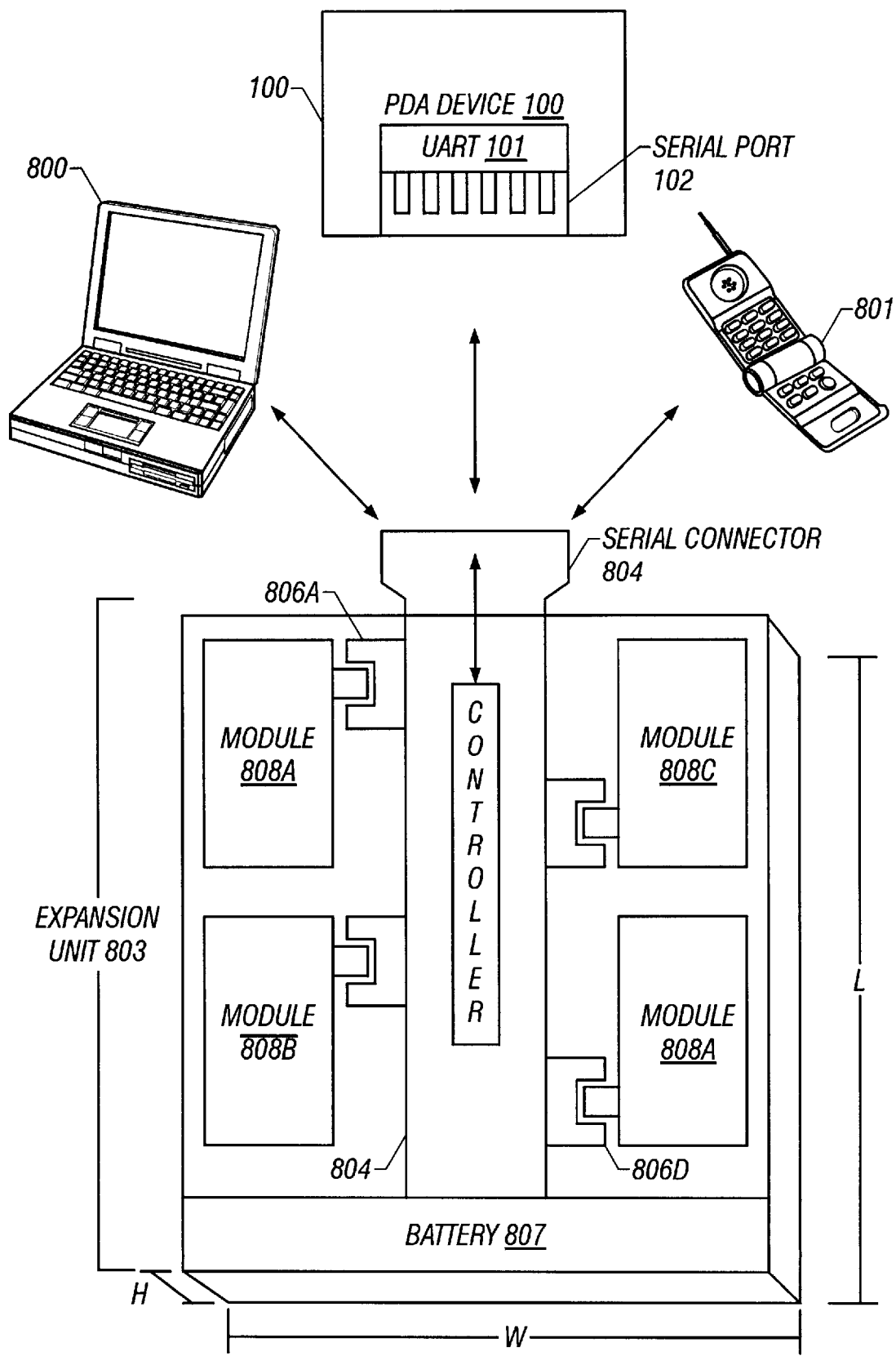
FIG. 8 is a hardware block diagram of a modular expansion unit for a host computing device, such as a personal digital assistant, in accordance with an embodiment of the invention.

FIG. 8 presents a hardware block diagram of an expansion unit (803) coupled via a serial link to a host computing device, such as PDA device 100, in accordance with one embodiment of the invention. Serial port 102 of PDA device 100 is driven by UART 101. Other computing devices, such as laptop computer 800, telephone 801, etc., may also be utilized as a host computing device. Expansion unit 803 is coupled to serial port 102, or a serial port of another host computing device, via serial connector 804. Serial connector 804 is coupled to controller 805 through a driver device (not shown) such as a UART. Alternatively, controller 805 may implement the functions of a UART directly. Also, other port types may be substituted for the serial port link (e.g., IR, RF, parallel, etc.) in other embodiments, such that a host computing device and expansion unit 803 communicate via an IR link, for example, rather than a serial link.

Expansion unit 803 is equipped with a back plane 804 containing a data bus. Pluggable interconnects 806A, 806B, 806C and 806D, as well as controller 805, are coupled into back plane 804. Port interface modules 808A, 808B, 808C and 808D are plugged into interconnects 806A, 806B, 806C and 806D, respectively to communicate with controller 805. Battery 807 is coupled to back plane 804 to provide power signals for each device on expansion unit 803, including controller 805 and modules 808A–808D.

Firmware executed by controller 805 implements the multiplexor and device recognition functions of expansion unit 803. Modules 808A–808D provide pluggable support for various port types and devices as described above with reference to FIG. 4. A variety of port and device configurations are possible, providing expanded utility for PDA device 100, or any other host computing device. Further, the expansion unit shown may be designed to fit into a standard pocket for easy portability. In one embodiment, to achieve greater portability, dimensions for expansion device 803 are, for example, approximately: height (H) less than 1", width (W) less than 2.5", and length (L) less than 3". The dimensions of other embodiments may differ based on, for example, the number of port modules to be supported by a single expansion unit, or form factor considerations with respect to a specific host computing device. This form factor allows the expansion unit to be easily carried about and used conveniently where portability is needed.

Figure 9:
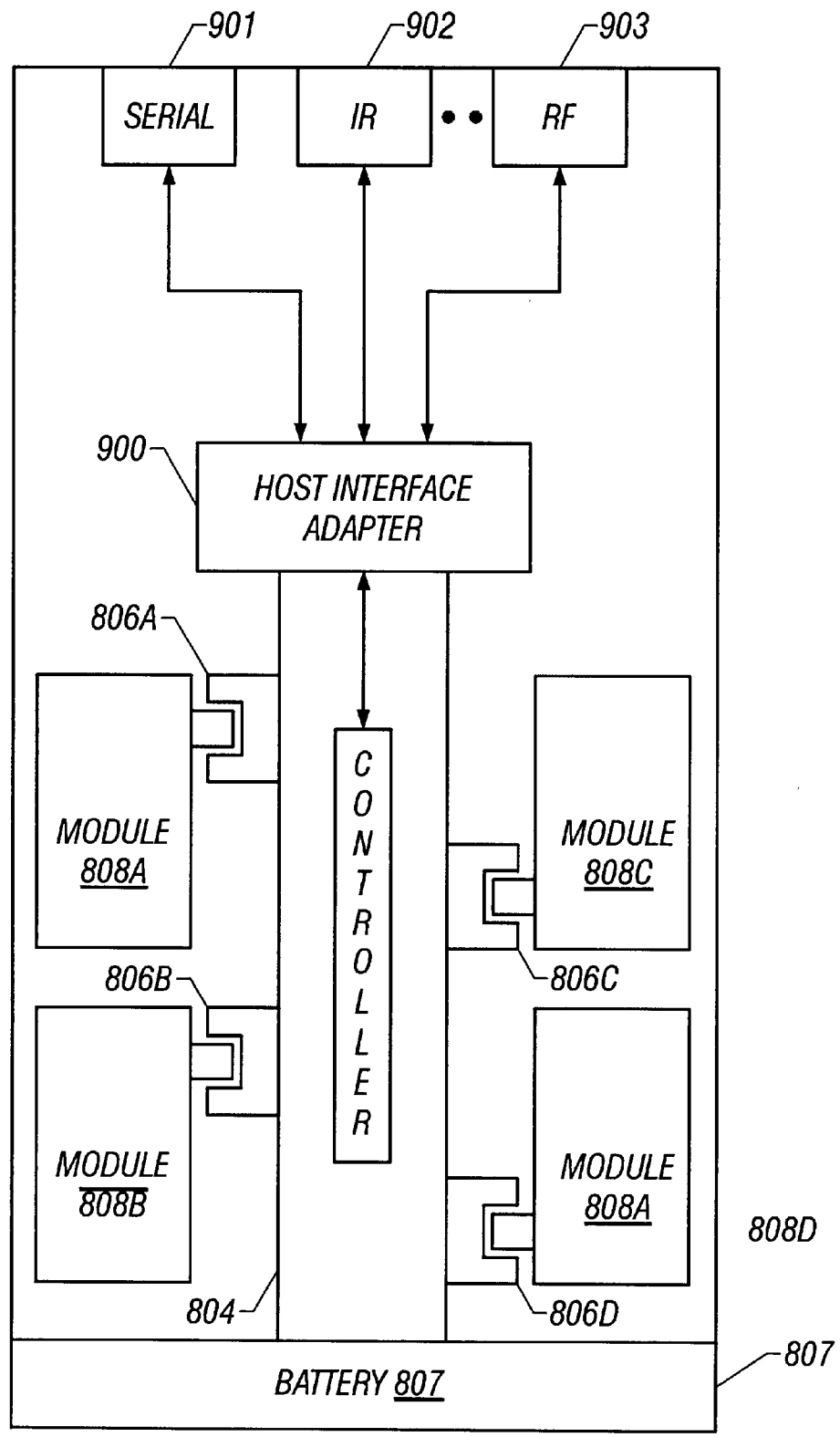
FIG. 9 is a hardware block diagram of a modular expansion unit having multiple host interface ports in accordance with an embodiment of the invention.

FIG. 9 illustrates a further embodiment of an expansion unit that provides multiple ports for establishing a link with a host computing device. Similarly to expansion unit 803 of FIG. 8, the expansion unit of FIG. 9 comprises back plane 804, interconnects 806A–806D, modules 808A–808D, controller 805 and battery 807. However, as an expansion unit main port, the expansion unit of FIG. 9 comprises host interface adapter 900 coupled to controller 805 (e.g., via back plane 804), and multiple host interface ports 901–903 coupled to host interface adapter 900.

The multiple host interface ports 901–903 are of different port types to permit the expansion unit to link with a host computing device via one of several available ports based on which port is supported by the host computing device. For example, in the illustrated embodiment, host interface ports 901–903 comprise a serial port, an IR port and an RF port. A host computing device may link with the expansion unit of the illustrated embodiment if the host computing device has a serial port, an IR port or an RF port. Other embodiments may differ in number and types of host interface ports depending on the degree of versatility desired.

Host interface adapter 900 is configured to support the communication protocol for each of host interface ports 901–903, and to perform any necessary conversion to permit communication between controller 805 and host interface ports 901–903. Host interface adapter 900 may be configured to activate a selected one of host interface ports 901–903 at power-up, for example, or host interface adapter 900 may poll each of host interface ports 901–903 in turn to determine which port is currently active (e.g., by attempting a handshake operation via each host interface port until the host computing device successfully responds via the "active" host interface port). The communication link with the host computing device is then maintained via the active host interface port.

Thus, a method and apparatus for providing modular I/O expansion of computing devices has been described in conjunction with one or more specific embodiments. The invention is defined by the claims and their full scope of equivalents.

What is claimed is:

1. An apparatus comprising:
   a main port for interfacing with a host computing device;
   a bus;
   a plurality of port interface modules coupled to said bus;
   a multiplexor coupled to said main port and said bus, said multiplexor configured to route data between said main port and said plurality of port interface modules based on a current routing state, said multiplexor configured to change said routing state in response to a control signal received from said main port.

2. The apparatus of claim 1, wherein said apparatus is portable.

3. The apparatus of claim 2, wherein said apparatus has dimensions equal to or smaller than 1"×2.5"×3".

4. The apparatus of claim 1, wherein said port interface modules are pluggable.

5. The apparatus of claim 1, wherein said multiplexor is configured to recognize said plurality of port interface modules and to recognize devices coupled thereto.

6. The apparatus of claim 5, wherein said multiplexor is configured to transmit identity information of said plurality of port interface modules to said host computing device.

7. The apparatus of claim 1, wherein said plurality of port interface modules have a plurality of port types.

8. The apparatus of claim 1, wherein said main port comprises:
   a plurality of ports of different port types; and
   a host interface adapter coupled to said plurality of ports of different port types, said host interface adapter configured to communicate with each of said plurality of ports of different port types.

9. The apparatus of claim 8, wherein said host interface adapter is configured to detect an active port from said plurality of ports types.

10. An apparatus comprising:
    a host computing device having a host port, said host computing device comprising:
       at least one port interface object accessible by at least one application executing within said host computing device;
       a first multiplexor coupled to said at least one port interface object and said host port, said first multiplexor comprising a current first routing state specifying a flow of data between said at least one port interface object and said host port, said first multiplexor configured to change said current first routing state in response to a control signal received from said host port;
    an expansion unit having a main port linked to said host port, said expansion unit comprising:
       at least one port interface module configured to couple at least one device to said expansion unit; and
       a second multiplexor coupled to said at least one port interface module and said main port, said second multiplexor comprising a current second routing state specifying a flow of data between said at least one port interface module and said main port, said second multiplexor configured to change said second current routing state in response to a control signal received from said main port.

* * * * *